United States Patent
Arndt et al.

(10) Patent No.: US 6,761,923 B2
(45) Date of Patent: *Jul. 13, 2004

(54) METHOD AND COMPOSITION RELATED TO LOW GLYCEMIC INDEX FOODS

(75) Inventors: Elizabeth A. Arndt, Omaha, NE (US); Sambasiva R. Chigurupati, Omaha, NE (US); Sarath K. Katta, Highlands Ranch, CO (US)

(73) Assignee: ConAgra, Inc., Omaha, NE (US)

( * ) Notice: Subject to any disclaimer, the term of this patent is extended or adjusted under 35 U.S.C. 154(b) by 19 days.

This patent is subject to a terminal disclaimer.

(21) Appl. No.: 10/064,312

(22) Filed: Jul. 1, 2002

(65) Prior Publication Data

US 2003/0087018 A1 May 8, 2003

Related U.S. Application Data

(63) Continuation-in-part of application No. 09/613,664, filed on Jul. 11, 2000, now Pat. No. 6,503,555.

(51) Int. Cl.[7] .................................................. A23L 1/10

(52) U.S. Cl. .............................. 426/618; 426/2; 426/94; 426/549; 426/619; 426/620; 426/622

(58) Field of Search .............................. 426/2, 94, 549, 426/68, 619, 620, 622, 808

(56) References Cited

U.S. PATENT DOCUMENTS 4,568,557 A * 2/1986 Becker et al. ............... 426/618
6,503,555 B1 * 1/2003 Katta et al. ................. 426/618

OTHER PUBLICATIONS

C. McWard, Integrating value: specialty flours and grains, Baking and Snack, 1995.*

* cited by examiner

Primary Examiner—Lien Tran
(74) Attorney, Agent, or Firm—Polsinelli Shalton & Welte

(57) ABSTRACT

The present invention relates to a method for using Prowashonupana barley to produce a food product comprised primarily of the Prowashonupana barley. The resultant food product is desired because, when consumed, it does not contribute to significantly elevated glycemic indices in a host, as indicated by the rapidly available glucose (RAG) assay.

11 Claims, 2 Drawing Sheets

METHOD AND COMPOSITION RELATED TO LOW GLYCEMIC INDEX FOODS

CROSS REFERENCE TO RELATED APPLICATIONS

The present application is a continuation-in-part of U.S. patent application Ser. No. 09/613,664, which was filed on Jul. 11, 2000 now U.S. Pat. No. 6,503,555.

FIELD OF INVENTION

The present invention relates to using Prowashonupana barley to form a food product, and the resultant Prowashonupana food products, which are designed to inhibit or possibly prevent an elevated glycemic index when such products are consumed.

BACKGROUND OF INVENTION

Dietary carbohydrates can be divided into chemically-based classifications, which include sugars, starch fractions, and non-starch polysaccharides. Certain dietary carbohydrates, when consumed, can result in an elevated blood sugar or glucose level, which can be indicated by a measurement known as the Glycemic Index (GI). The GI is an indication of the effect of a particular food product on a person's blood sugar. This indication is measured by an in vivo testing procedure, whereby blood samples are taken from a subject at time zero and at specific time intervals after the consumption of a food item or meal. The blood glucose level of each sample is then calculated and plotted versus the time, and then the incremental area under the curve is calculated. As such, the GI will not only be calculated for the tested product but also for a reference product. The GI is expressed as a percentage, based on the ratio of the mean incremental area of the test food divided by the mean incremental area for the reference food. A high GI equates to an increased sugar level or comparatively high blood glucose levels.

Testing a subject for GI levels can be expensive and time consuming. For this reason, alternative tests have been developed, which are designed to indicate the GI. One such test is known as the rapidly available glucose assay (RAG). This assay indicates the amount of glucose found in a food product available for rapid absorption into the small intestine. The test involves incubating the food with enzymes under standardized conditions. The amount of glucose that is released is then measured at different time intervals with released glucose quantitated by colorimetry or HPLC. This is then converted into an RAG measurement. There is a correlation between RAG and GI that is highly significant. The correlation of RAG to GI was discussed by Englyst et al., 1996, and Englyst et al., 1999. As such, RAG can be used as a rapid method to indicate the GI of various foods.

Elevated blood glucose will cause an elevated insulin response by the host. Increased insulin levels are known to contribute to the development of non-insulin dependent (Type II) diabetes. It has also been hypothesized that chronic consumption of a high glycemic index diet contributes to a high incidence of obesity. Food products, which have a low glycemic index, result in a decreased insulin response, which lowers the chance of the onset of Type II diabetes.

Snack foods, such as potato chips, crackers, and corn chips, as well as ready-to-eat (RTE) cereals, provide readily available starch to a consumer. This equates to a comparatively high GI. More particularly, when these products are consumed, the starch can readily be digested which, in turn, raises the RAG or GI. Despite the undesired effect associated with consumption of such snack foods, they are popular with consumers. For this reason, it is hypothesized that despite the long term risk associated with the consumption of such products, consumers will continue to each such food products. Thus, it is desired to have a snack food that has a desired texture and flavor but does not result in a comparatively high RAG or GI when consumed. In particular, it is desired to have a snack food comprised of an amount of grain or flour that is not comprised of readily available carbohydrates. It is most preferred if the grain or flour does not result in an elevated RAG or GI.

The GI for various foods is as follows (based on GI of glucose=100):

[t1]

| | |
|---|---|
| White Bread | 70 |
| Corn Flakes | 84 |
| Crisped Rice | 88 |
| Oatmeal | 61 |
| Shredded Wheat | 69 |
| Ice Cream | 61 |
| Milk, full fat | 27 |
| Orange | 43 |
| Orange Juice | 57 |
| Sucrose | 65 |
| Corn Chips | 73 |

The source is Brand Miller.

Generally, a GI below 55 is considered to be desirable, with lower numbers considered even better (based on GI of glucose=100).

Various known grain-based products have been analyzed to determine the GI or RAG. Prior to extrusion, many of the grains demonstrate an acceptable RAG. After extrusion most of the flours have a significantly higher RAG. For this reason, it is desired to have a flour constituent that can be extruded and does not result in a significantly increased RAG.

Another problem is that many grain products which can be used to form a low GI snack have an undesired mouth feel and taste. Too often, such constituents are used to produce a product that is too dense and does not have a sufficient mouth-feel.

Additionally, some constituents used in snack products are not nutritionally complete because they are comprised primarily of starch and contain low amounts of protein, insoluble fiber, and soluble fiber. An example of a flour product that initially has a low RAG, but is unacceptable for use, is high amylose corn starch (HACS). The HACS has comparatively low protein and fiber levels. More importantly, when extruded, the HACS has an elevated RAG.

Most types of barley flour have desirable protein and fiber levels but result in an elevated RAG. It is desired to have a barley flour whereby the beneficial constituents remain but the RAG is lower. Unfortunately, typical ground barleys that are extruded into a food product, provide rapidly digested starches that translate into a RAG equal to roughly 51%. It is desired to have a barley that results in an RAG that is equal to 25% or less and does not have to be specially treated.

There are some barley flours that have a lower RAG. Most of these barley flours are fractions of whole barley that have been treated to enhance the soluble fiber content. Without processing, these types of barley do not result in a lower RAG. Processing can be expensive. It is desired to have an untreated barley that results in a low RAG and is nutritionally complete.

Prowashonupana barley is an identity preserved variety of barley having enhanced amounts of soluble and insoluble fiber. The enhanced fiber level of the Prowashonupana barley is indigenous to the Prowashonupana variety. Additionally, the Prowashonupana barley variety contains approximately half of the starch content of other types of barley. Because the Prowashonupana barley has comparatively less starch, it has been hypothesized by the inventor that it would be more difficult to form a cracker or snack. It is desired, however, to have a product that includes Prowashonupana barley but is still considered desired by consumers. It is desired to have a product that includes the health benefits of Prowashonupana barley and still has a desired texture.

SUMMARY OF INVENTION

The present invention relates to a method for using Prowashonupana barley flour to form a food product and the resultant food product. The grain constituent used to form the food product can be comprised of between 50% and 100% Prowashonupana barley. A secondary grain constituent can preferably be mixed with the Prowashonupana barley to form a mixed grain product. The preferred method of the present invention involves combining an amount of Prowashonupana barley flour with an amount of another or secondary grain constituent to form a mixture of Prowashonupana barley and the secondary grain constituent known as the mixed grain product. The mixture is then extruded to form a food product. During the extrusion process, the grain is cooked.

As mentioned, the Prowashonupana barley is an identity preserved barley product having an amount of total dietary fiber equal to at least 30% by weight and an amount of protein equal to at least 16% by weight. Further, the Prowashonupana barley flour will have an amount of starch equal to about 30% by weight. As such, the Prowashonupana barley flour has comparatively higher amounts of fiber and less starch.

The food product will preferably be comprised of an amount of the mixed grain product, whereby the grain product is comprised of between 50% and 90% by weight of the Prowashonupana barley flour. More preferably, the mixed grain constituent will be comprised of between 70% and 90% by weight of the Prowashonupana barley flour, with 80% being the most preferred amount. The use of a mixed grain product is preferred to ensure that the resultant food product is not too dense. The secondary grain constituent is used to lower the density of the resultant food product.

The resultant Prowashonupana barley food product is advantageous because, when consumed, an elevated glycemic index is not contributed to and may be inhibited. Also, the food products will be nutritionally advantageous, whereby a sufficient amount of protein and fiber will comprise the food product. The resultant food product is also unique in that the RAG or glycemic index in an extruded food product will not become elevated as a result of extrusion, whereas, many other types of grains will have an elevated RAG after extrusion. Another advantage is that a snack, cracker, or ready-to-eat breakfast cereal can be formed from the Prowashonupana flour that has a desirable texture and mouth-feel.

DETAILED DESCRIPTION

Figure 1:
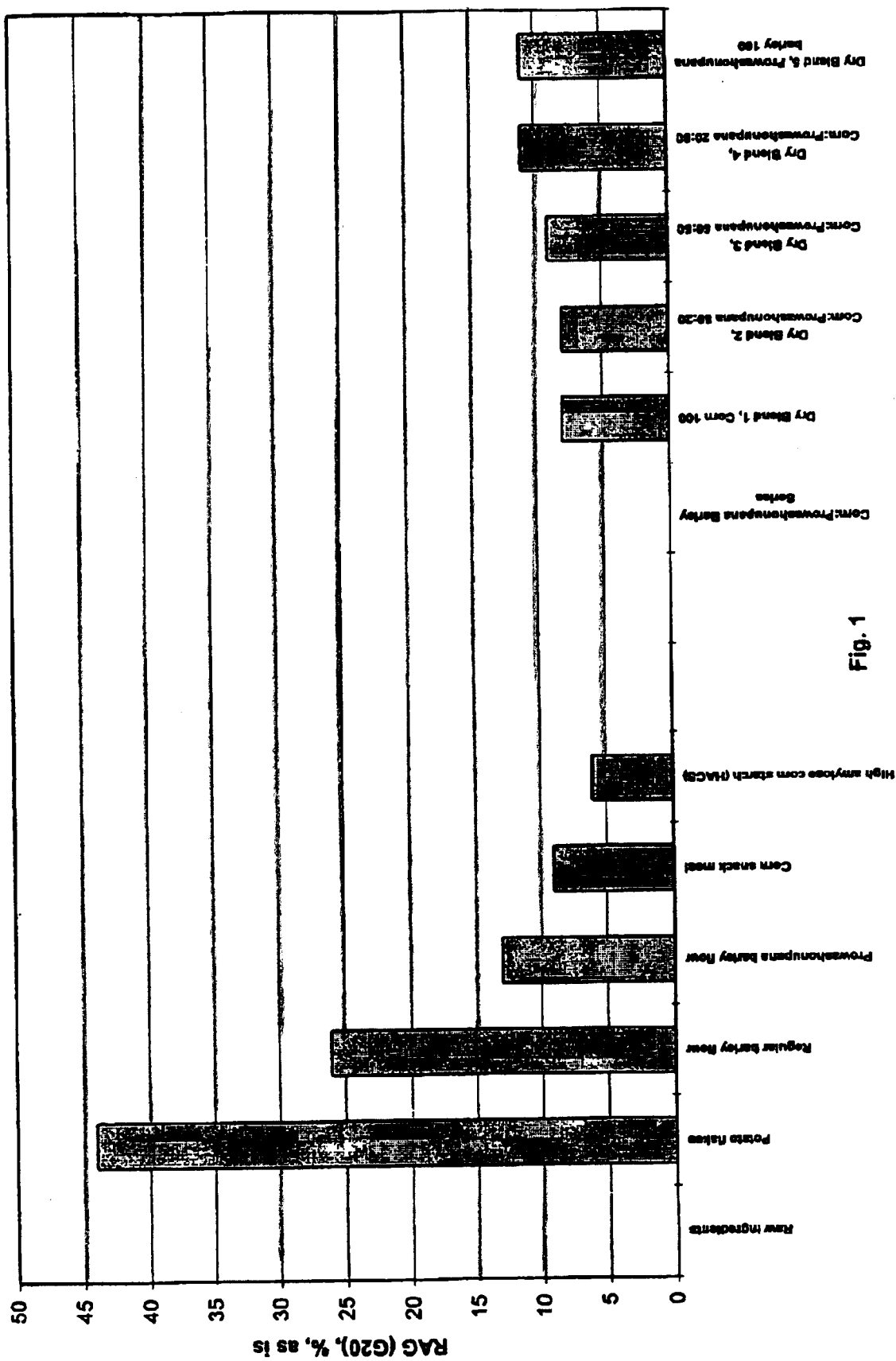
FIG. 1 shows the RAG for various flour constituents, both alone and in combination, before extrusion; and, FIG. 2 shows the RAG for various flour constituents, both alone and in combination, after extrusion.

The present invention relates to a method for using a Prowashonupana barley flour to produce a food product and the resultant food product. In particular, the present invention relates to food products made from an amount of Prowashonupana barley flour. The use of Prowashonupana is advantageous because when consumed, the Prowashonupana product does not contribute to a comparatively elevated glycemic index as indicated by measuring the RAG. The Prowashonupana product further provides the consumer with a desirable amount of soluble and insoluble fiber and protein. Additionally, the Prowashonupana barley can be extruded into a snack product or a flaked cereal that has an acceptable taste and texture.

The method is initiated by obtaining an amount of Prowashonupana barley flour. Prowashonupana barley is a particular variety that differs from other barley varieties in that it has a comparatively higher percentage of soluble and insoluble fiber. The proximate composition (as is basis) of Prowashonupana barley is:

[t2]

| | |
|---|---|
| Moisture | 11% |
| Ash | 2.4% |
| Protein | 16% |
| Fat | 6.4–7% min |
| Total Dietary Fiber | 30% min (12–15% β-glucan) |
| Starch | 30% |

The flour is obtained by harvesting the barley and processing it according to conventional barley dry milling production methods. Since Prowashonupana barley is hulless, it is not necessary to heavily pearl the barley to remove the attached hulls prior to grinding the barley into flour. For Prowashonupana barley, it is only necessary to abrade (pearl) off 5% by weight of the kernel. This is done to ensure removal of any attached hulls. The advantage of only having to pearl lightly is that it preserves the total dietary fiber content and the whole grain status of the resultant flour.

The Prowashonupana barley flour then can be mixed with other grain constituents to form a food product. Preferably, the Prowashonupana barley flour is combined with another or secondary grain, or other starch-based constituents, to form a mixed grain product for use in manufacturing extruded snacks and flaked cereals. The secondary grain is added to reduce the density of the resultant product or mixed grain product. The Prowashonupana barley flour will be added in an amount equal to between 50% and 90% by weight of the mixed grain product. More preferably, the Prowashonupana barley flour is added in an amount equal to between 70% and 90% by weight of the grain constituent. The most preferred mixed grain product is comprised of 80% by weight Prowashonupana barley flour and 20% by weight secondary grain. Types of grains or other starch-based constituents that can be mixed with the Prowashonupana barley flour include, but are not limited to, corn, wheat, barley, high amylose corn starch, soy, potato, and any of a variety of other flours or grains. It is important to ensure that a sufficient amount of Prowashonupana barley flour is included in the mixture so as to ensure that the product has a comparatively lower resultant RAG, while still maintaining acceptable protein and fiber amounts. The finished food product preferably contains between about 50% and about 90% by weight Prowashonupana barley flour. Preferably, the finished food product will contain about 80% by weight Prowashonupana barley flour.

Once the Prowashonupana barley flour and secondary grain have been combined, an amount of a flavor constituent is preferably added thereto. The flavor constituent can be comprised of any of a variety of flavor components. As such, the flavor constituents include, but are not limited to, salt, malt, sugar, spices, and any other flavor constituent typically used in a snack food or cereal. The mixture is then passed into a system for extruding the composition to produce an extruded snack or cereal. After extrusion, the products are dried according to standard drying procedures, whereby a sufficient amount of water is removed to lower the water activity level so as to prevent microbial growth.

During extrusion, the mixture, including the barley, is cooked. As is known, extrusion is a process, whereby starch is plasticized under high temperature and pressure and forced through a molder or die. To cook is to prepare for eating by applying heat. In particular, cooking is a process, whereby a raw food stuff is converted to a palatable, more readily digestible condition by application of heat.

The snack or cereal, when consumed, will result in a lower RAG in a subject when compared with other types of snacks or cereals. Generally, the Prowashonupana snack or cereal will lower RAG by 5%. Preferably, the present snack or cereal will only produce an RAG of 30% or less. This appears to be an important product for helping to promote good health. When consumed as part of a healthy diet, it could lower the occurrences of Type II diabetes.

EXAMPLES

Example 1

An extruded flaked-type cereal was produced by combining Prowashonupana barley flour with either high amylose corn starch or soy flour. Additionally, added to the barley mixture were flavor ingredients. The constituents were mixed in a standard mixer to form a homogenous mix composition. The homogenous mixture was then fed into a pre-conditioner, which was a Wenger TX-57 rotating at a speed of 350 rpm. The steam flow into the pre-conditioner was equal to between 8 kg and 9 kg per hour, and the water flow was equal to between 15 kg and 16 kg per hour.

After conditioning, the material was then fed into a Wenger TX 57 twin screw extruder cooker. The moisture content of the mixture entering the extruder was between 23% and 29%, and the extruder had a shaft speed equal to 350 rpm. The steam flow into the extruder was equal to between 5 kg and 6 kg per hour, and the water flow was equal to between 3 kg and 20 kg per hour. The flavor constituents were added to the extruder at a rate equal to between 18 kg and 21 kg per hour. The temperature in the first head of the extruder was equal to between 40° C. and 66° C., the temperature in the second head of the extruder was equal to between 78° C. and 80° C., the temperature in the third head of the extruder was equal to between 115° C. and 119° C., and the temperature in the fourth head of the extruder was equal to between 116° C. and 120° C.

The material was extruded into a Wenger X-25 forming extruder, having a variable speed drive motor. The former barrel consisted of segmented heads and a single piece forming screw. After passing through the forming extruder, the material passed through a Wenger flaking oil system.

The flaked material was then dried in a drier/cooler Model 4800 Wenger Series IV.

The dryer has three zones of varying temperatures, with the Zone 1 having a temperature equal to 175° C., Zone 2 having a temperature equal to 165° C., and Zone 3 having a temperature equal to 165° C. The retention time in the dryer was 0.8 minutes followed by a second pass in which the retention time was 2.5 minutes. This resulted in a dry toasted product suitable for consumption as a ready-to-eat cereal.

Shown below are the flour compositions for the five runs conducted in the present Example:

TABLE 1

| Run | Prowashonupana Barley Flour (%) | High Amylose Corn Starch (%) | Soy Flour (%) |
| --- | --- | --- | --- |
| 1 | 80 | 20 | 0 |
| 2 | 65 | 35 | 0 |
| 3 | 50 | 50 | 0 |
| 4 | 80 |  | 20 |
| 5 | 65 |  | 35 |

The percentages are calculated by weight.

Table 2 shows the flavor constituents added to each of the compositions of the five runs:

TABLE 2

| Flavor: 19 kg/hr added as slurry | |
| --- | --- |
| Ingredient | Percent by Weight |
| Sugar | 47.5 |
| Water | 28.5 |
| Malt (Maltoline ER) | 14.5 |
| Salt | 9.5 |

Table 3 discusses the moisture conditions during each step of the extrusion process.

TABLE 3

| Moisture Analysis on Process | |
| --- | --- |
| Pre-conditioner Discharge, % wb | 23.0–29.0 |
| Extruder Discharge, % wb | 24.0–36.0 |
| Flaking Rolls Discharge, % wb | 24.0–32.5 |
| Dryer Discharge, % wb | 1.4–2.7 | wb = wet basis

The constituents to be extruded were analyzed individually and in combination, prior to extrusion, using approved AOAC and AACC analytical procedures. The results are as follows:

TABLE 4

| Sample | Moisture % | Ash % | Protein % | β-Glucan % | Fat % | TDF % |
| --- | --- | --- | --- | --- | --- | --- |
| Prowashonupana Barley | 9.05 | 1.198 | 18.46 | 18.03 | 4.94 | 35.25 |
| HACS | 12.69 | 0.062 | 0.73 | 0 | 1.12 | 14.39 |
| Soy Flour | 8.5 | 7.0 | 52.0 | 0 | 1.5 | 4.0 |
| Run 1 | 9.96 | 1.507 | 14.75 | 14.44 | 4.94 | 29.75 |
| Run 2 | 10.33 | 1.288 | 12.33 | 11.93 | 4.12 | 27.05 |
| Run 3 | 11.13 | 0.968 | 9.52 | 9.02 | 3.42 | 22.73 |
| Run 4 | 9.29 | 2.788 | 24.78 | 14.66 | 5.04 | 30.53 |
| Run 5 | 8.96 | 4.283 | 35.72 | 9.24 | 3.83 | 26.79 |

HACS: High amylose corn starch (70%

TABLE 4-continued

| Sample | Moisture % | Ash % | Protein % | β-Glucan % | Fat % | TDF % |
|---|---|---|---|---|---|---|
| amylose) | | | | | | |
| Soy Flour: | | | | | | |
| Soyafluff 200W | | | | | | |
| TDF: Total | | | | | | |
| Dietary Fiber | | | | | | |

As can be seen, Prowashonupana is preferred over HACS because it has a higher amount of dietary fiber and β-glucan. It is further advantageous because it has a higher protein percentage.

The extruded flakes were analyzed. The results follow:
[t7]

TABLE 5

| Sample | Moisture % | Ash % | Protein % | β-Glucan % | Fat % | TDF % |
|---|---|---|---|---|---|---|
| 1 | 3.39 | 2.589 | 13.53 | 13.15 | 4.22 | 27.38 |
| 2 | 3.38 | 2.415 | 11.34 | 11.18 | 3.77 | 26.11 |
| 3 | 2.98 | 2.200 | 8.95 | 8.42 | 3.15 | 23.39 |
| 4 | 3.57 | 2.578 | 23.07 | 14.73 | 5.03 | 31.08 |
| 5 | 3.87 | 1.155 | 35.60 | 9.27 | 3.60 | 26.09 |

Samples 1, 2, 3, 4, and 5 are the extruded products from Runs 1, 2, 3, 4, and 5.

Runs 1 and 4 had the highest percentage of Prowashonupana barley and, correspondingly, had the highest percent of total dietary fiber. The differences between the extruded and raw products were negligible, with changes attributable to a changing water percentage.

Example 2

An extruded flaked-type cereal was again produced by the same procedure as recited in Example 1. Four runs of different constituents were conducted. The constituents for each run are listed below in Table 6.
[t8]

TABLE 6

| Run | Prowashonupana Barley Flour % | High Amylose Corn Starch % | Potato Starch % | Psyllium % |
|---|---|---|---|---|
| 1 | 80 | 20 | 0 | 0 |
| 2 | 50 | 50 | 0 | 0 |
| 3 | 50 | 0 | 50 | 0 |
| 4 | 80 | 0 | 0 | 20 |

The flavor constituents added are listed in Table 7.
[t9]

TABLE 7

Flavor: 25 kg/hr added as slurry

| Ingredient | Percent |
|---|---|
| Sugar | 47.5 |
| Water | 28.5 |
| Malt (Maltoline ER) | 14.5 |

TABLE 7-continued

Flavor: 25 kg/hr added as slurry

| Ingredient | Percent |
|---|---|
| Salt | 9.5 |

The individual constituents and combination of constituents were analyzed prior to extrusion. The results are disclosed in Table 8.
[t10]

TABLE 8

| Sample | Moisture % | Ash % | Protein % | β-Glucan % | Fat % | TDF % | RAG g/100 g dry |
|---|---|---|---|---|---|---|---|
| Prowashonu-pana Barley | 9.05 | 1.918 | 18.46 | 18.03 | 4.94 | 35.25 | 29.8 |
| HACS | 12.69 | 0.062 | 0.73 | 0.00 | 1.12 | 14.39 | 17.1 |
| Potato Starch | 19.31 | 0.286 | 0.07 | 0.12 | 0.01 | 1.13 | 8.2 |
| Psyllium | 11.2 | 3.349 | 5.45 | 0.00 | 2.22 | 98.84 | 0.9 |
| 1 | 10.07 | 1.587 | 14.37 | 14.57 | 4.79 | 29.75 | 32.4 |
| 2 | 11.13 | 0.968 | 9.52 | 9.02 | 3.42 | 22.73 | 23.8 |
| 3 | 14.26 | 1.183 | 9.74 | 9.95 | 3.04 | 25.0 | 22.9 |
| 4 | 9.81 | 2.12 | 15.48 | 14.41 | 5.09 | 48.0 | 22.0 |

TDF: Total Dietary Fiber
RAG: Rapidly Available Glucose

After extrusion, the products were analyzed, with the results listed below:
[t11]

TABLE 9

| Sample | Moisture % | Ash % | Protein % | β-Glucan % | Fat % | TDF % | RAG |
|---|---|---|---|---|---|---|---|
| 1 | 2.39 | 1.850 | 12.35 | 12.40 | 3.79 | 27.38 | 36.4 |
| 2 | 2.98 | 2.200 | 8.95 | 8.42 | 3.15 | 23.39 | 54.9 |
| 3 | 4.06 | 1.496 | 8.46 | 8.40 | 2.46 | 17.42 | 58.7 |
| 4 | 2.85 | 3.573 | 13.04 | 12.56 | 4.00 | 46.00 | 25.2 |

The products with the highest percentage of Prowashonupana barley had the highest percentage of protein, fiber, and β-glucan. They also had the lowest RAG. This demonstrates that use of the Prowashonupana produces a superior product that lowers RAG, while still imparting desirable nutritional components.

Example 3

A direct expanded snack product was produced by combining Prowashonupana barley flour with either potato flakes, high amylose corn starch (HACS), or corn snack meal in varying percentages by weight. One percent salt was also added to each formula. The constituents were mixed in a standard mixer to form a homogenous mix composition. The homogenous mixture was then fed into a pre-conditioner, which was a Wenger TX-57, rotating at a speed of 125 rpm. There was no steam or water fed to the pre-conditioner. The material exited from the pre-conditioner at 25° C.–29° C.

The material was then fed into a Wenger TX-57 twin screw extruder cooker. The extruder shaft speed ranged from 350 rpm-450 rpm. The water flow into the extruder ranged from 20–50 kg/hr. The temperature in the first head of the extruder was equal to between 50° C.–80° C., and the temperature in the second head of the extruder was equal to between 100° C.–110° C. The knife drive speed ranged between 20–40 rpm.

The direct expanded snack was then dried in a drier/cooler Model 4800 Wenger Series IV. The Zone 1 temperature was 100° C. The retention time in the dryer was 2 minutes followed by a second pass in which the retention time was 3.5 minutes. This resulted in a stable product suitable for consumption as a snack product.

RAG was measured using an in vitro technique, based on the measurement of glucose released from a test food during timed incubation with digestive enzymes under standardized conditions. HPLC was used to quantitate the glucose. The protocol for the test was disclosed by Englyst.

The following is a comparison of the RAG of raw ingredients before and after extrusion:
[t12]

| Ingredient | Raw RAG | Extruded RAG | Difference % |
|---|---|---|---|
| Potato Flakes | 44 | 55 | 11 |
| HACS | 6 | 44 | 38 |
| Corn | 9 | 40 | 31 |
| Prowashonupana barley | 13 | 23 | 10 |
| Regular Barley | 26 | 51 | 25 |

To follow are individual comparisons between raw and extruded materials:
[t13]

| Potato: | |
|---|---|
| Raw | 44 RAG |
| Extruded | 55 RAG |

The starch in the potato flake is already very accessible, making extrusion to increase availability unnecessary.
[t14]

| HACS: | |
|---|---|
| Raw | 6 RAG |
| Extruded | 44 RAG |

In the raw state, native HACS is less accessible. Also, high amylose starch is less accessible to enzyme digestion due to the arrangement of the linear amylose molecules. After extrusion, the starch is gelatinized, making the starch molecules easily accessible to enzyme attack.
[t15]

| Corn: | |
|---|---|
| Raw | 9 RAG |
| Extruded | 40 RAG |

In the raw state, the corn snack meal particles are large enough to limit the accessibility of the starch to enzyme digestion, thus keeping RAG low. Extrusion gelatinizes starch, which makes a large increase in starch accessibility.
[t16]

| Prowashonupana Barley: | |
|---|---|
| Raw | 13 RAG |
| Extruded | 23 RAG |

Low starch content helps limits increase in RAG that can occur after barley is extruded. High fiber content forms a barrier around starch to limit availability to enzyme attack.
[t17]

| Regular Barley: | |
|---|---|
| Raw | 26 RAG |
| Extruded | 51 RAG |

The starch in raw barley flour appears to be fairly accessible to enzyme attack. After extrusion, the starch is gelatinized and is readily digestible.

The following is a comparison of Corn: Prowashonupana barley blends before and after extrusion:
[t18]

| Blend | Dry Blend RAG | Extruded RAG | Difference % |
|---|---|---|---|
| Corn, 100% | 8 | 40 | 32 |
| Corn: Prowashonupana barley 80:20 | 8 | 46 | 38 |
| Corn: Prowashonupana barley 50:50 | 9 | 37 | 28 |
| Corn: Prowashonupana barley 20:80 | 11 | 19 | 8 |
| Prowashonupana barley | 11 | 23 | 12 |

Figure 2:
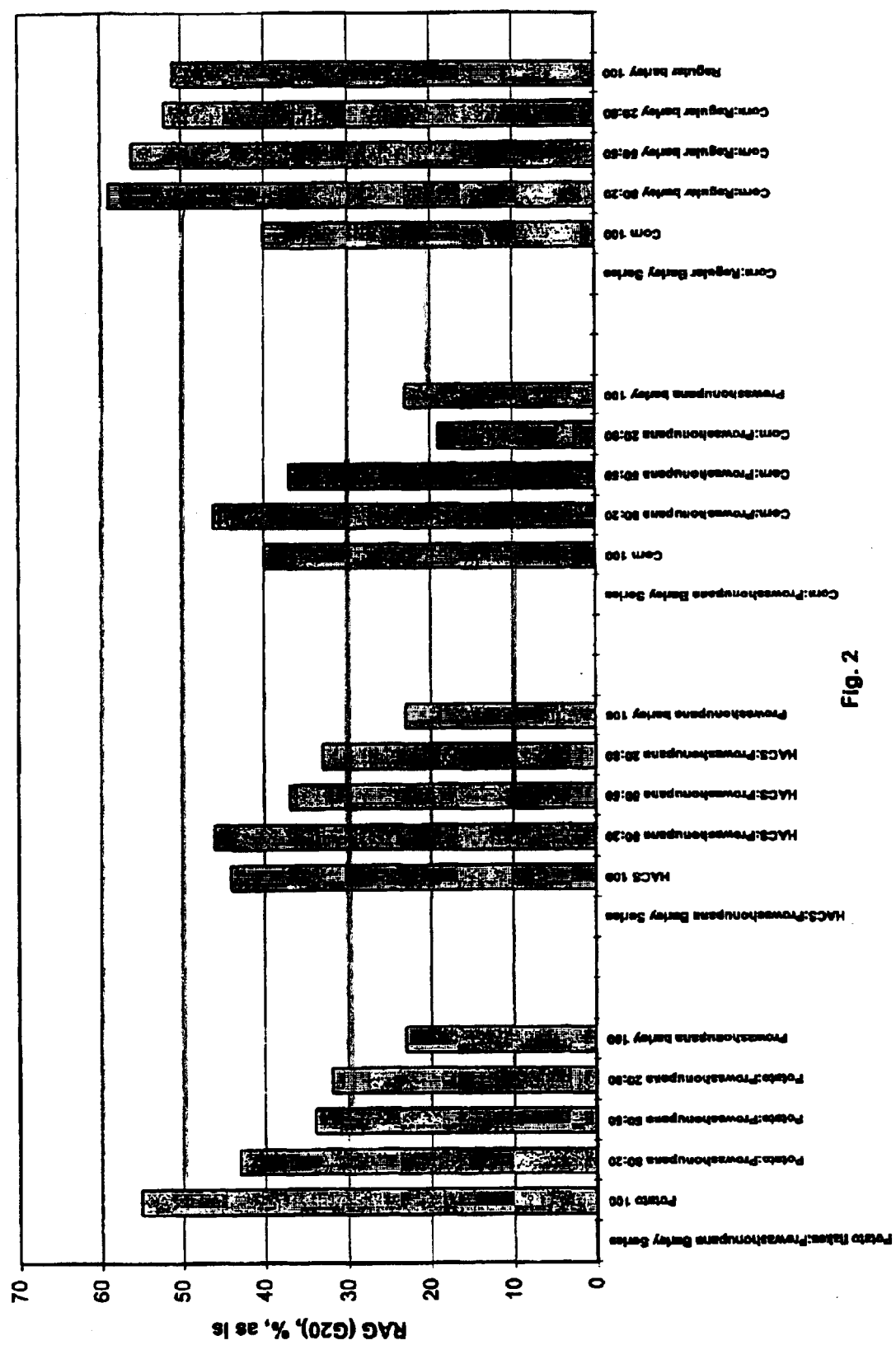

FIGS. 1 and 2 illustrate the results discussed above.

There is little difference in the RAG values between the different raw corn: Prowashonupana barley blends. Extrusion increases RAG in all blends and individual constituents, as shown above. The increase in RAG that occurs with extrusion appears to be reduced when the snack is formulated with at least 80% Prowashonupana barley.

Thus, there has been shown and described a novel product associated with using Prowashonupana barley in a food product, which fulfills all of the objects and advantages sought therefor. It will be apparent to those skilled in the art, however, that many changes, variations, modifications, and other uses and applications for the subject product are possible, and also changes, variations, modifications, and other uses and applications which do not depart from the spirit and scope of the invention are deemed to be covered by the invention which is limited only by the claims which follow.

REFERENCES

Englyst et al. 1996. Measurement of rapidly available glucose (RAG) in plant foods:
   a potential in vitro predictor of the glycemic response. British J. Nutr. 75:327.

Englyst et al. 1999. Rapidly available glucose in foods: an in vitro measurement that reflects glycemic response. Am. J. Clin. Nutr. 69:448.

Brand Miller, J. 1995. International tables of glycemic index. Am. J. Clin. Nutr. 62:871S.

What is claimed is:

1. A method for not contributing to an elevated glycemic index after consumption of a food product, wherein said method consists of:
   (a) forming a food product consisting of a Prowashonupana barley constituent and a secondary grain constituent, wherein between 50% and 90% by weight of said food product is a Prowashonupana barley flour constituent, whereby said food product is formed by extruding and cooking said grain constituent at a temperature high enough to cook said Prowashonupana barley and said secondary grain constituent; and
   (b) consuming such food product.

2. The method of claim 1, wherein said Prowashonupana barley constituent comprises between 80% and 90% by weight of said food product.

3. The method of claim 1, wherein said food product comprises at least 50% of all food product consumed during a sitting.

4. The method of claim 1, wherein said method lowers RAG by at least 5%.

5. The method of claim 1, wherein said secondary grain is selected from the group consisting of corn, wheat, barley, high amylose corn starch, potato, and soy.

6. A method for using Prowashonupana barley, whereby said method consists of:
   (a) obtaining a mixture consisting of an amount of Prowashonupana barley and a secondary grain constituents; and,
   (b) extruding and cooking said barley and grain constituent mixture at a temperature high enough to cook said mixture to form a ready-to-eat food product, which does not contribute to an elevated glycemic index.

7. The method of claim 6, wherein said Prowashonupana barley constituent comprises between 80% and 90% by weight of said food product.

8. A method of using a Prowashonupana barley constituent to produce a food product having a lower glycemic index, wherein said food product consists of said Prowashonupana barley constituent and a secondary grain constituent, whereby said method consists of substituting said Prowashonupana barley constituent for flour used to form said food product, with said Prowashonupana substituted in an amount equal to at least 50% by weight of said food product and extruding said Prowashonupana barley and said secondary grain constituent at temperatures high enough to cook said food product.

9. The method of claim 1, wherein said extrusion takes place at temperatures between about 66° C. to about 120° C.

10. The method of claim 6, wherein said extrusion takes place at temperatures between about 66° C. to about 120° C.

11. The method of claim 8, wherein said extrusion takes place at temperatures between about 66° C. to about 120° C.

* * * * *

UNITED STATES PATENT AND TRADEMARK OFFICE
CERTIFICATE OF CORRECTION

PATENT NO. : 6,761,923 B2
DATED : July 13, 2004
INVENTOR(S) : Arndt et al.

It is certified that error appears in the above-identified patent and that said Letters Patent is hereby corrected as shown below:

Column 2,
Line 5, delete "each" and insert -- eat -- therefor.

Column 8,
Line 47, delete "O-glucan" and insert -- β-glucan -- therefor.

Column 12,
Lines 4 and 5, delete "constituents" and insert -- constituent -- therefor.

Signed and Sealed this

Eighth Day of February, 2005

JON W. DUDAS
*Director of the United States Patent and Trademark Office*